US012613910B2

(12) United States Patent
Kim et al.

(10) Patent No.: US 12,613,910 B2
(45) Date of Patent: Apr. 28, 2026

(54) APPARATUS AND METHOD FOR PROVIDING CONTENT

(71) Applicants:HYUNDAI MOTOR COMPANY, Seoul (KR); KIA CORPORATION, Seoul (KR); IUCF-HYU (INDUSTRY-UNIVERSITY COOPERATION FOUNDATION HANYANG UNIVERSITY), Seoul (KR)

(72) Inventors: Ki Chang Kim, Suwon-si (KR); Eun Soo Jo, Hwaseong-si (KR); Dong Chul Park, Anyang-si (KR); Eun Ju Jeong, Seoul (KR); Ji Yeon Shin, Seoul (KR)

(73) Assignees: HYUNDAI MOTOR COMPANY, Seoul (KR); KIA CORPORATION, Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 18/212,862

(22) Filed: Jun. 22, 2023

(65) Prior Publication Data

US 2024/0202236 A1     Jun. 20, 2024

(30) Foreign Application Priority Data

Dec. 16, 2022     (KR) ........................ 10-2022-0177526

(51) Int. Cl.
| | |
|---|---|
| *G06F 16/635* | (2019.01) |
| *G06F 16/65* | (2019.01) |
| *G06F 16/683* | (2019.01) |

(52) U.S. Cl.
CPC ............ *G06F 16/636* (2019.01); *G06F 16/65* (2019.01); *G06F 16/683* (2019.01)

(58) Field of Classification Search
CPC ...... G06F 16/636; G06F 16/65; G06F 16/683; G06F 16/639; G10H 2210/00;
(Continued)

(56) References Cited

U.S. PATENT DOCUMENTS

| | | | | |
|---|---|---|---|---|
| 8,221,246 | B2 * | 7/2012 | Lee .......................... | A47C 7/72 463/47 |
| 9,788,777 | B1 * | 10/2017 | Knight ............... | G06Q 30/0269 |

(Continued)

FOREIGN PATENT DOCUMENTS

| | | | |
|---|---|---|---|
| CN | 214775519 U | * | 11/2021 |
| KR | 2024-0005444 A | | 1/2024 |
| KR | 2024-0005445 A | | 1/2024 |

OTHER PUBLICATIONS

Çano, Erion; Coppola, Riccardo; Morisio, Maurizio; Gargiulo, Eleonora; Marengo, Marco; (2017). Mood-based On-Car Music Recommendations. In: 2nd EAI International Conference on Industrial Networks and Intelligent Systems (INISCOM 2016), Leicester (United Kindom), Nov. 1, 2016. pp. 154-163 (Year: 2016).*

*Primary Examiner* — William P Bartlett
(74) *Attorney, Agent, or Firm* — MCDONNELL BOEHNEN HULBERT & BERGHOFF LLP

(57)     ABSTRACT

An apparatus for providing content includes a communication device that communicates with user equipment (UE) and a processor connected with the communication device. The processor analyzes a music database (DB) by interworking with the UE, extracts a driver emotion model based on the result of analyzing the music DB, determines an emotion determination model based on the result of analyzing the music DB, derives an emotional care correlation equation by means of a multi-regression analysis based on
(Continued)

the result of analyzing the music DB, selects an emotional care solution depending on a contribution rate of the emotion determination model based on the driver emotion model using the emotional care correlation equation, and automatically play music content based on the emotional care solution.

10 Claims, 11 Drawing Sheets

(58) Field of Classification Search
 CPC ................ G10H 2240/00; G06V 20/00; Y10S
 707/916; A61B 5/00
 See application file for complete search history.

(56) References Cited

U.S. PATENT DOCUMENTS

| | | | | |
|---|---|---|---|---|
| 10,878,787 | B2 * | 12/2020 | Hampiholi | B60K 35/10 |
| 11,580,941 | B2 * | 2/2023 | Wipperfürth | G10H 1/0008 |
| 2006/0143647 | A1 * | 6/2006 | Bill | G06F 16/636 |
| | | | | 707/E17.101 |
| 2010/0312042 | A1 * | 12/2010 | Anderson | G06F 16/683 |
| | | | | 600/28 |
| 2011/0040707 | A1 * | 2/2011 | Theisen | G11B 27/105 |
| | | | | 706/46 |
| 2011/0295843 | A1 * | 12/2011 | Ingrassia, Jr. | G06F 16/4387 |
| | | | | 707/723 |
| 2012/0016208 | A1 * | 1/2012 | Janssen | G06F 16/636 |
| | | | | 600/300 |
| 2012/0233164 | A1 * | 9/2012 | Rowe | G06F 16/637 |
| | | | | 707/E17.046 |
| 2014/0052731 | A1 * | 2/2014 | Dahule | G11B 27/034 |
| | | | | 707/740 |
| 2015/0254955 | A1 * | 9/2015 | Fields | G06Q 30/0283 |
| | | | | 340/576 |
| 2015/0297109 | A1 * | 10/2015 | Garten | A61B 5/38 |
| | | | | 600/28 |
| 2016/0162565 | A1 * | 6/2016 | Jung | G06F 16/639 |
| | | | | 707/737 |
| 2016/0196105 | A1 * | 7/2016 | Vartakavi | G06F 3/165 |
| | | | | 700/94 |
| 2019/0027162 | A1 * | 1/2019 | Fukayama | G10L 25/45 |
| 2019/0042180 | A1 * | 2/2019 | Vartakavi | G06F 3/165 |
| 2019/0389396 | A1 * | 12/2019 | Van Laack | B60R 11/0223 |
| 2020/0129728 | A1 * | 4/2020 | Pinkerton | G16H 50/20 |
| 2020/0213790 | A1 * | 7/2020 | Osborne | G16H 50/20 |
| 2020/0215294 | A1 * | 7/2020 | Lee | A61M 21/02 |
| 2020/0242421 | A1 * | 7/2020 | Sobhany | B60W 50/08 |
| 2020/0286505 | A1 * | 9/2020 | Osborne | G06N 20/00 |
| 2023/0027322 | A1 * | 1/2023 | Schofman | G06F 16/683 |
| 2023/0186878 | A1 * | 6/2023 | Wipperfürth | G06F 3/165 |
| | | | | 715/772 |
| 2023/0259551 | A1 * | 8/2023 | Boulard | H04N 21/4532 |
| | | | | 700/94 |
| 2023/0377601 | A1 * | 11/2023 | Nimmagadda | G06F 40/30 |
| 2024/0008786 | A1 | 1/2024 | Kim et al. | |
| 2024/0009421 | A1 | 1/2024 | Kim et al. | |

* cited by examiner

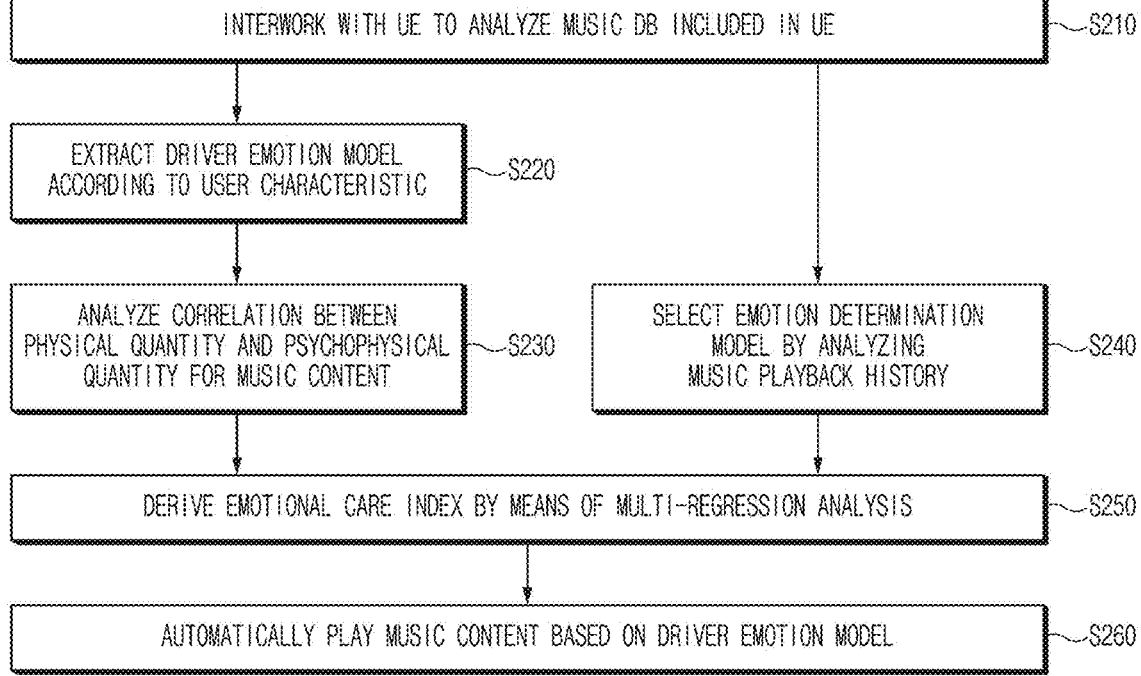

INTERWORK WITH UE TO ANALYZE MUSIC DB INCLUDED IN UE —S210

EXTRACT DRIVER EMOTION MODEL ACCORDING TO USER CHARACTERISTIC —S220

ANALYZE CORRELATION BETWEEN PHYSICAL QUANTITY AND PSYCHOPHYSICAL QUANTITY FOR MUSIC CONTENT —S230

SELECT EMOTION DETERMINATION MODEL BY ANALYZING MUSIC PLAYBACK HISTORY —S240

DERIVE EMOTIONAL CARE INDEX BY MEANS OF MULTI-REGRESSION ANALYSIS —S250

AUTOMATICALLY PLAY MUSIC CONTENT BASED ON DRIVER EMOTION MODEL —S260

FIG.2

|  | Domain | AUDITORY QUALITATIVE PARAMETER | | | | TACTILE QUALITATIVE PARAMETER | | | |
|  |  | Audio | | | | Tactile | | | |
|  | Attributes | Pitch | Duration | Loudness | Timbre | Location | Duration | Intensity | Acuity |
| CONTENT SIGNAL ANALYSIS FACTOR VALUE | Frequency · average | -0.370 | -0.453 | 0.169 | -0.263 | .669** | -0.401 | 0.101 | 0.196 |
|  | Frequency · Max | -0.167 | 0.273 | (*1)-.528* | 0.131 | .622* | -0.454 | 0.062 | 0.175 |
|  | Beats | -0.324 | 0.126 | -.514 | 0.043 | -0.418 | -0.248 | -0.257 | -0.166 |
|  | Zero-Crossing | -0.493 | -0.154 | -0.344 | -0.115 | 0.370 | -.544* | -0.070 | 0.080 |
|  | dB · avg | 0.370 | 0.453 | -0.169 | 0.263 | -.650** | 0.425 | -0.084 | -0.187 |
|  | dB · max | 0.050 | 0.404 | -0.457 | 0.215 | -0.209 | .537* | 0.129 | -0.025 |
|  | dB · min | 0.050 | 0.404 | -0.457 | 0.215 | -0.209 | .537* | 0.129 | -0.025 |
|  | Centrord · avg | -0.370 | 0.070 | -0.494 | 0.011 | 0.117 | -.520* | -0.158 | -0.005 |
|  | Rolloff · avg | -0.314 | 0.137 | -.517* | 0.049 | -0.007 | -0.483 | -0.191 | -0.044 |
|  | MFCC · avg | 0.246 | -0.206 | .530** | -0.090 | -.530* | 0.510 | -0.005 | -0.138 |

FIG.5A

| Domain | | Audio | | | | Tactile | | | |
|---|---|---|---|---|---|---|---|---|---|
| Attributes | | Pitch | Duration | Loudness | Timbre | Location | Duration | Intensity | Acuity |
| Frequency | Frequency * average | -0.065 | -0.384 | -0.345 | 0.000 | 0.125 | -0.262 | 0.153 | -0.140 |
| | Frequency * Max | -0.170 | -0.495 | -0.404 | -0.230 | 0.165 | 0.169 | 0.013 | -0.165 |
| Duration | Beats | -0.162 | -0.385 | -0.300 | -0.259 | 0.121 | 0.325 | -0.064 | -0.113 |
| | Zero-Crossing | 0.002 | -0.215 | -0.211 | 0.100 | 0.069 | -0.367 | 0.166 | -0.086 |
| Power | dB * avg | -0.003 | 0.211 | 0.208 | -0.102 | -0.117 | 0.284 | -0.157 | 0.132 |
| | dB * max | 0.062 | 0.379 | 0.341 | -0.004 | -0.133 | 0.241 | -0.148 | 0.147 |
| | dB * min | 0.062 | 0.379 | 0.341 | -0.004 | -0.133 | 0.241 | -0.148 | 0.147 |
| Spectrogram Feature | Centrord * avg | 0.139 | 0.261 | 0.190 | 0.252 | -0.005 | -0.417 | 0.150 | -0.011 |
| | Rolloff * avg | 0.136 | 0.247 | 0.177 | 0.250 | -0.111 | -0.344 | 0.076 | 0.102 |
| | MFCC * avg | 0.037 | 0.318 | 0.294 | -0.043 | -0.171 | 0.038 | -0.092 | 0.179 |

AUDITORY QUALITATIVE PARAMETER

TACTILE QUALITATIVE PARAMETER

CONTENT SIGNAL ANALYSIS FACTOR VALUE

FIG.5B

|  |  | AUDITORY QUALITATIVE PARAMETER | | | | TACTILE QUALITATIVE PARAMETER | | | |
| Domain | Attributes | Audio | | | | Tactile | | | |
|  |  | Pitch | Duration | Loudness | Timbre | Location | Duration | Intensity | Acuity |
| Frequency | Frequency * average | -0.448 | 0.055 | -0.153 | 0.034 | 0.069 | 0.079 | -0.166 | 0.222 |
|  | Frequency * Max | -0.032 | -0.178 | 0.207 | .734** | 0.490 | 0.117 | 0.177 | 0.373 |
| Duration | Beats | -0.037 | -0.177 | 0.205 | .733** | 0.494 | 0.117 | 0.181 | 0.374 |
|  | Zero-Crossing | -0.189 | -0.139 | 0.130 | .668** | 0.327 | 0.109 | 0.025 | 0.332 |
| Power | dB * avg | 0.411 | -0.129 | 0.235 | 0.287 | 0.217 | -0.031 | 0.330 | -0.057 |
|  | dB * max | 0.405 | -0.134 | 0.240 | 0.309 | .535* | 0.116 | 0.229 | 0.376 |
|  | dB * min | 0.405 | -0.134 | 0.240 | 0.310 | .535* | 0.116 | 0.229 | 0.376 |
| Spectrogram Feature | Centrord * avg | -0.352 | -0.064 | 0.008 | 0.459 | -0.368 | -0.002 | -0.395 | -0.049 |
|  | Rolloff * avg | -0.357 | 0.160 | -0.261 | -0.440 | -0.335 | -0.109 | -0.031 | -0.335 |
|  | MFCC * avg | 0.431 | -0.110 | 0.216 | 0.198 | -0.361 | -0.111 | -0.054 | -0.344 |

CONTENT SIGNAL ANALYSIS FACTOR VALUE

FIG.5C

EXECUTE VIRTUAL DRIVING
BASED ON DRIVING SCENARIO ~S610

AUTOMATICALLY PLAY MUSIC CONTENT ~S620

MEASURE BIOMETRIC SIGNAL AND
RECEIVE EMOTIONAL EVALUATION DATA ~S630

PERFORM VERIFICATION EVALUATION
FOR EMOTIONAL CARE SOLUTION BY
ANALYZING BIOMETRIC SIGNAL
AND EMOTIONAL EVALUATION DATA ~S640

APPARATUS AND METHOD FOR PROVIDING CONTENT

CROSS REFERENCE TO RELATED APPLICATIONS

This application claims the benefit of priority to Korean Patent Application No. 10-2022-0177526, filed in the Korean Intellectual Property Office on Dec. 16, 2022, the entire contents of which are incorporated herein by reference.

TECHNICAL FIELD

The present disclosure relates to an apparatus and a method for providing content.

BACKGROUND

When the traffic flow is not smooth due to road construction, accidents, and/or a congestion phenomenon while a vehicle is traveling, a driver of the vehicle may remain inside the vehicle for a long time, causing irritation and stress. At this time, the driver selects and plays desired music content to relieve the irritation and stress.

SUMMARY

The present disclosure has been made to solve the above-mentioned problems occurring in the prior art while advantages achieved by the prior art are maintained intact.

An aspect of the present disclosure provides an apparatus and a method for providing content to automatically play music content with regard to a driving environment and a driver's emotional state.

Another aspect of the present disclosure provides an apparatus and a method for providing content to derive an emotional care index by means of a multi-regression analysis and analyze a pleasure, arousal, dominance (PAD) contribution rate to automatically play music content.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for providing content may include a communication device that communicates with user equipment (UE) and a processor connected with the communication device. The processor may analyze a music database (DB) interwork with the UE, may extract a driver emotion model based on the result of analyzing the music DB, may determine an emotion determination model based on the result of analyzing the music DB, may derive an emotional care correlation equation by means of a multi-regression analysis based on the result of analyzing the music DB, may select an emotional care solution depending on a contribution rate of the emotion determination model based on the driver emotion model using the emotional care correlation equation, and may automatically play music content based on the emotional care solution.

The processor may analyze the music DB and may classify a music genre.

The processor may analyze a music playback history in the music DB and may select the emotion determination model.

The processor may analyze a correlation between a physical quantity and a psychophysical quantity of the music content in the music DB, and may derive the emotional care correlation equation based on the result of analyzing the correlation.

The physical quantity may include at least one of sound pressure, a frequency, a spectrum, an envelope, a duration, or a combination thereof.

The psychophysical quantity may include at least one of loudness, pitch, timbre, or a combination thereof.

The processor may derive the emotional care correlation equation using at least one of a histogram, a scatterplot, a probabilities-probabilities (P-P) chart, or a combination thereof.

The processor may automatically play the music content by interworking with a vehicle driving condition and a driver's emotional state.

The processor may obtain a determination coefficient of the emotional care correlation equation by means of a statistical analysis, and may generate an emotional care index based on the determination coefficient of the emotional care correlation equation.

The processor may set a target driver emotion model, may search for an acoustic perceptual factor of the music content, may set a sensory index parameter of the music content, and may derive the emotional care index by analyzing a correlation between the acoustic perceptual factor and the sensory index parameter based on the target driver emotion model.

According to another aspect of the present disclosure, a method for providing content may include analyzing a music database (DB) by interworking with user equipment (UE), extracting a driver emotion model based on the result of analyzing the music DB, determining an emotion determination model based on the result of analyzing the music DB, deriving an emotional care correlation equation by means of a multi-regression analysis based on the result of analyzing the music DB, selecting an emotional care solution depending on a contribution rate of the emotion determination model based on the driver emotion model using the emotional care correlation equation, and automatically playing music content based on the emotional care solution.

The extracting of the driver emotion model may include analyzing the music DB and classifying a music genre.

The determining of the emotion determination model may include analyzing a music playback history in the music DB and selecting the emotion determination model.

The deriving of the emotional care correlation equation may include analyzing a correlation between a physical quantity and a psychophysical quantity of the music content in the music DB and deriving the emotional care correlation equation based on the result of analyzing the correlation.

The deriving of the emotional care correlation equation may include deriving the emotional care correlation equation using at least one of a histogram, a scatterplot, a probabilities-probabilities (P-P) chart, or a combination thereof.

The automatically playing of the music content may include automatically playing the music content by interworking with a vehicle driving condition and a driver's emotional state.

The deriving of the emotional care correlation equation may include obtaining a determination coefficient of the emotional care correlation equation by means of a statistical analysis, and generating an emotional care index based on the determination coefficient of the emotional care correlation equation.

The generating of the emotional care index may include setting a target driver emotion model, searching for an acoustic perceptual factor of the music content, setting a sensory index parameter of the music content, and deriving the emotional care index by analyzing a correlation between the acoustic perceptual factor and the sensory index parameter based on the target driver emotion model.

BRIEF DESCRIPTION OF THE FIGURES

The above and other objects, features and advantages of the present disclosure will be more apparent from the following detailed description taken in conjunction with the accompanying drawings:

FIG. 2 is a flowchart illustrating a method for providing content according to an embodiment of the present disclosure;

FIGS. 5A, 5B, and 5C are drawings for describing an analysis of a correlation between physical and psychological quantities of content according to an embodiment of the present disclosure;

DETAILED DESCRIPTION

Figure 1:
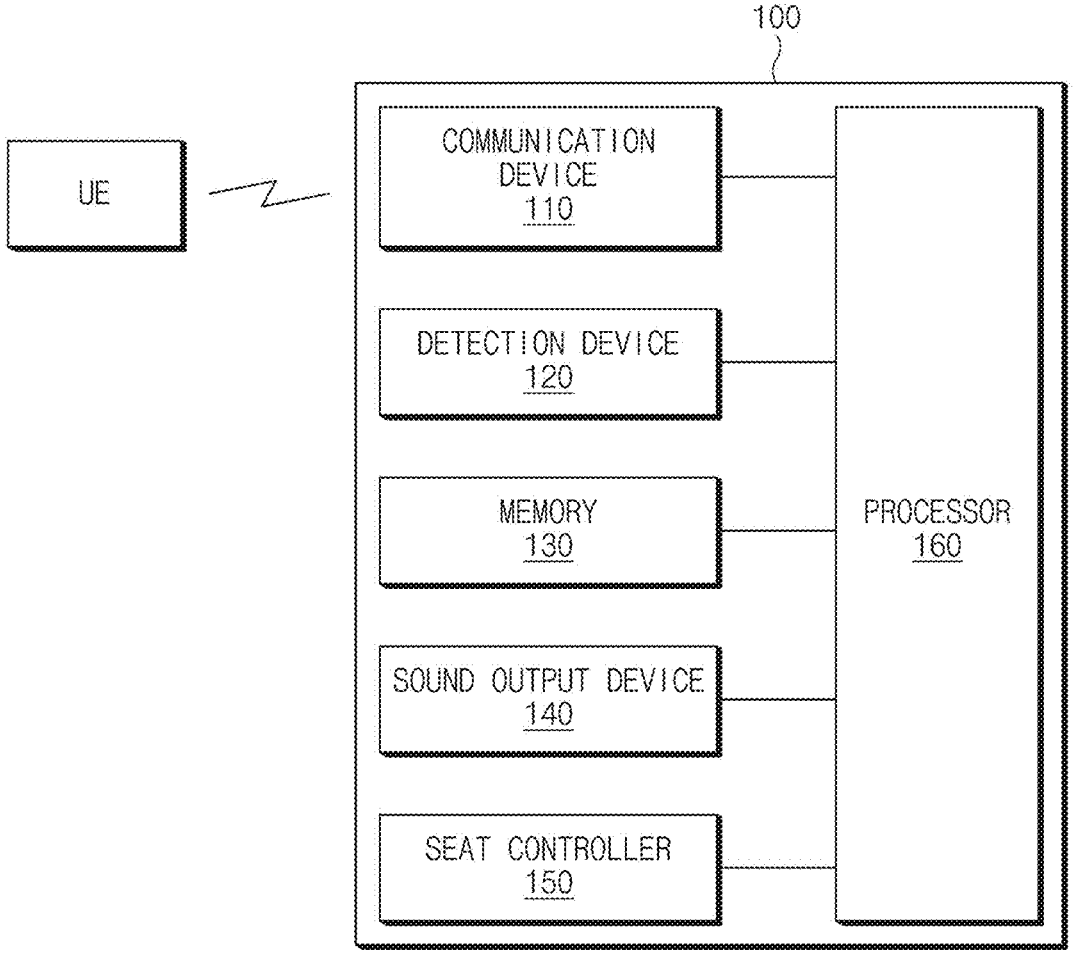
FIG. 1 is a block diagram illustrating a configuration of an apparatus for providing content according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for providing content according to an embodiment of the present disclosure.

An apparatus 100 for providing the content may be loaded into an electrification vehicle, such as an electric vehicle (EV), a plug-in hybrid electric vehicle (PHEV), and/or a hybrid electric vehicle (HEV), which travels using an electric motor. The apparatus 100 for providing the content may design a virtual sound based on a hearing experience of a user and may personalize the virtual sound by adjusting timbre and accelerator pedal responsiveness.

Referring to FIG. 1, the apparatus 100 for providing the content may include a communication device 110, a detection device 120, a memory 130, a sound output device 140, a seat controller 150, and a processor 160.

The communication device 110 may support the apparatus 100 for providing the content to communicate with an external electronic device (e.g., user equipment (UE), a server, and the like). The communication device 110 may include a short range wireless communication circuit, a wireless communication circuit, a wired communication circuit, and/or the like.

The communicator 110 may support the apparatus 100 for providing the content to communicate with electronic control units (ECUs) mounted on the vehicle. The communication device 110 may include a transceiver which transmits and receives a controller area network (CAN) message using a CAN protocol.

The detection device 120 may detect driving information and/or environmental information (i.e., vehicle interior environment information and/or vehicle exterior environment information). The detection device 120 may detect driving information such as a driver steering angle (or a steering wheel steering angle), a tire steering angle (or a tie rod), a vehicle speed, motor revolutions per minute (RPM), a motor torque, and/or an accelerator pedal opening amount using sensors and/or ECUs loaded into the vehicle. An accelerator position sensor (APS), a steering angle sensor, a microphone, an image sensor, a distance sensor, a wheel speed sensor, an advanced driver assistance system (ADAS) sensor, a 3-axis accelerometer, an inertial measurement unit (IMU), and/or the like may be used as the sensors. The ECUs may be a motor control unit (MCU), a vehicle control unit (VCU), and/or the like.

The memory 130 may include a big data-based sound database (DB). The big data-based sound DB may include a future-oriented DB, a human voice DB, a natural sound DB, an animal sound DB, and an exhaust sound DB. The future-oriented DB may include a spaceship sound or the like. The human voice DB may include a family voice, an actor voice, and the like. The natural sound DB may include a sound of waves, a sound of heavy rain, a sound of wind, and the like. Furthermore, the animal sound DB may include a tiger sound, a lion sound, and the like. The exhaust sound DB may include a backfire sound or the like. The memory 130 may store a sound source of a virtual sound such as a tire slip sound, a warning sound, a driving sound, an acceleration sound, and/or a cornering sound.

The memory 130 may store an emotion determination model, a driver emotion model, a sound design algorithm, and/or the like. The memory 130 may be a non-transitory memory which stores instructions executed by the processor 160. The memory 130 may include at least one of storage media such as a random access memory (RAM), a static RAM (SRAM), a read only memory (ROM), a programmable ROM (PROM), an electrically erasable and programmable ROM (EEPROM), an erasable and programmable ROM (EPROM), a hard disk drive (HDD), a solid state disk (SSD), an embedded multimedia card (eMMC), universal flash storage (UFS), or web storage.

The sound output device 140 may play and output a virtual sound through speakers mounted on the inside and/or outside of the vehicle. The sound output device 140 may play and output a sound source which is previously stored or is streamed in real time. The sound output device 140 may include an amplifier, a sound playback device, and the like. The sound playback device may adjust and play volume, timbre (or sound quality), a sound image, and the like of the sound under an instruction of the processor 160. The sound playback device may include a digital signal processor (DSP), microprocessors, and/or the like. The amplifier may amplify an electrical signal of the sound played from the sound playback device.

The seat controller 150 may control at least one vibrator mounted on a vehicle seat to generate a vibration (or a vibration signal). The seat controller 150 may adjust a vibration pattern, vibration intensity, a vibration frequency, and/or the like. At least one vibrator may be installed at a specific position of the vehicle seat, for example, a seat back, a seat cushion, a leg rest, and/or the like.

The seat controller 150 may control a vibrator, an actuator, and/or the like in a neck pillow to provide a haptic effect to a neck of a passenger (or a user) who sits on a vehicle seat. The neck pillow may be removably made at a boundary between a seat back and a headrest of the vehicle seat.

The processor 160 may be connected with the respective components 110 to 150. The processor 160 may include at least one of processing devices such as an application specific integrated circuit (ASIC), a digital signal processor (DSP), programmable logic devices (PLD), field program-mable gate arrays (FPGAs), a central processing unit (CPU), microcontrollers, or microprocessors.

The processor 160 may classify a music genre of music content in a music DB using an interworking streaming function with the UE. In other words, the processor 160 may interwork with the UE to analyze music content used by a user and identify a user characteristic. The processor 160 may extract driver emotion modeling based on the user characteristic. The processor 160 may match the driver emotion modeling with the analyzed music genre. The driver emotion modeling may be an emotional care solution, which may include a meditation mode (or healthy driving H), a stress relief mode (or safe driving S), and a healing mode (or fun driving F).

The processor 160 may interwork with the UE to analyze a music playback history and select an emotion determina-tion model. The processor 160 may analyze a musical factor (e.g., musical brightness, damping, attack, register, mode, musical articulation, tempo, or musical dynamics) of music content included in a recent music playback list used by the user and may select the emotion determination model (or a pleasure, arousal, dominance (PAD) model). The emotion determination model may estimate (or predict) an emotional state as pleasure, arousal, and dominance.

The processor 160 may generate an emotional care index by means of a multi-regression analysis. The emotional care index may be a correlation equation (or an emotional care correlation equation) by a statistical analysis, which may be derived as 9 correlation equations by means of an analysis between three factors of the emotion determination model based on three driver emotion modeling. Pleasure P, arousal A, and dominance D of the emotion determination model may reflect a correlation between a musical variable (or a musical factor) and a sensory (or auditory and/or tactile) qualitative parameter (or a sensory parameter) to derive a correlation equation such as Equation 1 below.

Emotional Care Index = $\qquad$ Equation 1

Emotional Care Solution × Target Emotion =

$$A + BX_1 + CX_2 + DX_3 + EX_4 + FX_5 + GX_6$$

A to F may be determination coefficients, and values thereof may be derived by means of a multi-regression analysis. $X_1$ denotes the pressure, $X_2$ denotes the frequency average value or the beat frequency for an auditory index and denotes the MFCC average value or a centroid average value for a tactile index, $X_3$ denotes the pitch, $X_4$ denotes the duration, $X_5$ denotes loudness, and $X_6$ denotes the timbre. $X_1$ to $X_6$ may be independent variables, and values thereof may be derived by the multi-regression analysis. Target emotion is a dependent variable.

For example, the processor 160 may derive an auditory emotional care solution for each emotional care solution by means of the multi-regression analysis as follows.

First emotional care solution $HP1 =$ $\qquad -3.463 - 0.143x_1 - 3.112x_2 - 0.138x_3 + 0.66x_4 - 0.341x_5 + 0.443x_6$ $HA1 = 0.19 + 0.33x_1 + 2.992x_2 - 0.229x_3 + 0.45x_4 - 0.14x_5 + 0.446x_6$ $HD1 =$ $\qquad -1.54 - 0.0107x_1 - 3.491x_2 + 0.196x_3 + 0.246x_4 - 0.498x_5 + 0.411x_6$ Second emotional care solution $SP1 = 0.91 + 0.002x_1 - 0.003x_2 - 0.134x_3 + 0.083x_4 + 0.106x_5 - 0.317x_6$ $SA1 = -6.795 + 0.001x_1 + 0.025x_2 + 0.244x_3 + 0.817 - 0.109x_5 + 0.131x_6$ $SD1 = -4.784 + 0.05x_1 - 0.001x_2 - 0.091x_3 + 0.758x_4 + 0.479x_5 - 0.32x_6$ Third emotional care solution $FP1 = 0.399 + 0.002x_1 + 0.00x_2 + 0.257x_3 + 0.196x_4 - 0.424x_5 - 0.076x_6$ $FA1 = -0.739 + 0.002x_1 + 0.00x_2 - 0.18x_3 - 0.194x_4 + 0.042x_5 + 0.089x_6$ $FD1 = 9.973 + 0.003x_1 - 0.003x_2 + 0.942x_3 + 0.116x_4 - 0.686x_5 + 0.088x_6$ The auditory emotional care solution, that is, an auditory correlation equation may vary with a PAD contribution rate like Table 1 below.

TABLE 1

| Solution | Emotion | Auditory correlation equation review |
|---|---|---|
| Healthy | P (+) | Auditory audio signal: The lower the average volume of the audio signal and the lower the brightness of the sound, the more the pleasure increases. However, only the average volume is significant. Perceptual evaluation: The lower the pitch, the longer the length of the sound, the lower the loudness, and the sharper the timbre, the more the pleasure increases. However, only the length of the sound is significant. |

TABLE 1-continued

| Solution | Emotion | Auditory correlation equation review |
|---|---|---|
| | A (0) | Auditory audio signal: The lower the average volume of the audio signal and the lower the brightness of the sound, the more the arousal decreases. Perceptual evaluation: The higher the pitch, the shorter the length of the sound, the louder the loudness, and the softer the timbre, the more arousal decreases. |
| | D (0) | Auditory audio signal: The higher the average volume of the audio signal and the higher the brightness of the sound, the more the dominance decreases. Perceptual evaluation: The higher the pitch, the shorter the length of the sound, the louder the loudness, and the softer the timbre, the more the dominance decreases. |
| Safe | P(++) | Auditory audio signal: The higher the average frequency value of the audio signal and the lower the frequency of the beat, the more the pleasure increases. Perceptual evaluation: The lower the pitch, the longer the length of the sound, the louder the loudness, and the softer the timbre, the more the pleasure increases. |
| | A(-- ) | Auditory audio signal: The lower the average frequency of the audio signal and the lower the frequency of the beat, the more the arousal decreases. Perceptual evaluation: The lower the pitch, the shorter the length of the sound, the louder the loudness, and the softer the timbre, the more the arousal decreases. |
| | D(+) | Auditory audio signal: The higher the average frequency value of the audio signal and the lower the frequency of the bit, the more the dominance increases. Perceptual evaluation: The lower the pitch, the longer the length of the sound, the louder the loudness, and the softer the timbre, the more the dominance increases. |
| Fun | P(++) | Auditory audio signal: The higher the average frequency value of the audio signal and the higher the brightness of the sound, the more the pleasure increases. Perceptual evaluation: The higher the pitch, the longer the length of the sound, the lower the loudness, and the softer the timbre, the more the pleasure increases. |
| | A(++) | Auditory audio signal: The higher the average frequency value of the audio signal and the higher the brightness of the sound, the more the arousal increases. Perceptual evaluation: The lower the pitch, the shorter the length of the sound, the louder the loudness, and the sharper the timbre, the more the arousal increases. |
| | D(++) | Auditory audio signal: The higher the average frequency value of the audio signal and the lower the brightness of the sound, the more the dominance increases. Perceptual evaluation: The higher the pitch, the higher the length of the sound, the lower the loudness, and the sharper the timbre, the more the dominance increases. |

An advanced two-way analysis of variance (ANOVA) (ATA) and crossover method may be used to derive a correlation equation by means of a statistical analysis. The variance and crossover analysis method may be to ensure robustness between factors. The processor 160 may select a factor with a large contribution rate based on the driver emotion modeling by means of a two-way ANOVA method of two factors and two or more groups for physical quantities of music content, for example, pressure, a frequency, a spectrum, an envelope, and a duration, and psychophysical quantities such as loudness, pitch, and timbre. The processor 160 may obtain a positive/negative slope value such as a numerical value before a variable by means of a crossover analysis between the selected factors. It is a stage of inter-population verification of physical and psychophysical quantities. When it is 0, the observed frequency and the expected frequency are exactly the same as each other. That a numerical value is large means that personalized emotion is larger than a standard emotional model. A positive number means that a factor has a high correlation and a negative number means that the factor has an opposite correlation. The processor 160 may finally select the emotion determination model based on the driver emotion model using the emotional care index, thus determining a final emotional care solution. The processor 160 may automatically select and play music content based on the finally determined emotional care solution, that is, driver emotion modeling. The processor 160 may interwork with the vehicle driving condition with the driver's emotional state to automatically play music content.

The processor 160 may implement emotional vibration based on the played sound. The processor 160 may control vibration of a vehicle seat or a wearable device based on the played sound.

FIG. 2 is a flowchart illustrating a method for providing content according to an embodiment of the present disclosure.

Referring to FIG. 2, in S210, an apparatus 100 for providing content in FIG. 1 may interwork with a UE to analyze a music DB included in the UE. The apparatus 100 for providing the content may determine a user characteristic. In other words, the apparatus 100 for providing the content may classify a music genre of music content in the music DB. The apparatus 100 for providing the content may measure a musical variable and/or a sensory qualitative parameter. The musical variable may include a register, a mode, articulation, and/or a tempo. The sensory qualitative parameter may include loudness, timbre, pitch, and/or duration.

In S220, the apparatus 100 for providing the content may extract (or determine) may a driver emotion model according to the user characteristic. The driver emotion model may include a meditation mode (or healthy driving H), a stress relief mode (or safe driving S), and a healing mode (or fun driving F).

In S230, the apparatus 100 for providing the content may analyze a correlation between a physical quantity (e.g., pressure, a frequency, a spectrum, an envelope, or a duration) and a psychophysical quantity (e.g., loudness, pitch, and timbre) for music content.

In S240, the apparatus 100 for providing the content may analyze a music playback history and may select an emotion determination model (or a PAD model). The apparatus 100 for providing the content may analyze a correlation between a musical timbre variable and a pleasure axis, a correlation between a musical form variable and an arousal axis, and a correlation between a musical expression variable and a dominance axis and may select the emotion determination model.

In S250, the apparatus 100 for providing the content may derive an emotional care index based on the driver emotion model and the emotion determination model by means of a multi-regression analysis. Contribution rates of the pleasure axis, the arousal axis, and the dominance axis of the emotion determination model may vary with a positive correlation and a negative correlation.

In S260, the apparatus 100 for providing the content may automatically play music content based on the driver emotion model using the derived emotional care index. The apparatus 100 for providing the content may finally select the emotion determination model based on the driver emotion model using the emotional care index. For example, when it is determined that the contribution rate of the pleasure axis of the emotion determination model is high based on the driver emotion model of the meditation mode, the apparatus 100 for providing the content may automatically play music content matched with an emotional care solution of the meditation mode. At this time, the apparatus 100 for providing the content may interwork with the vehicle driving condition and/or the driver's emotional state to automatically play music content.

Figure 3:
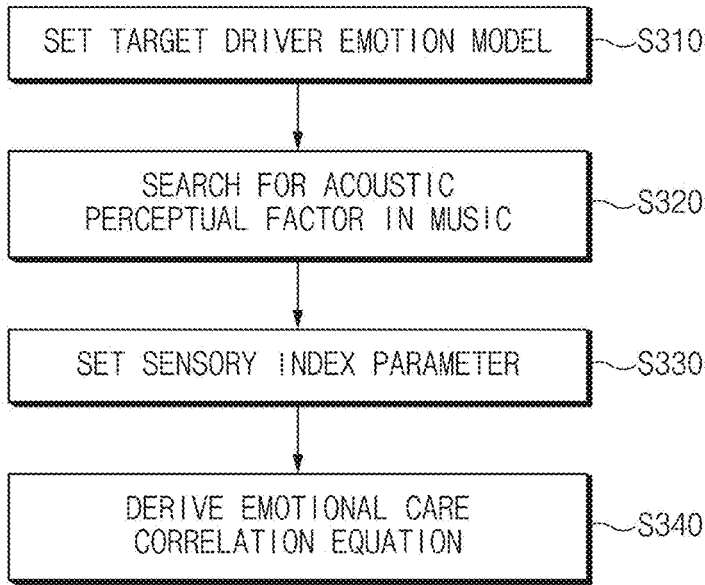
FIG. 3 is a flowchart illustrating a method for deriving an emotional care index according to an embodiment of the present disclosure.

FIG. 3 is a flowchart illustrating a method for deriving an emotional care index according to an embodiment of the present disclosure.

First of all, in S310, an apparatus 100 for providing content in FIG. 1 may set a target driver emotion model. In other words, the apparatus 100 for providing the content may set one of a meditation mode, a stress relief mode, or a healing mode to the target driver emotion model In S320, the apparatus 100 for providing the content may search for an acoustic perceptual factor in music. The acoustic perceptual factor may include a musical factor (or variable) such as a musical timbre variable (e.g., musical brightness, damping, and attack), a music form variable (e.g., a register and a mode), and/or a musical expression variable (e.g., musical articulation, a tempo, and musical dynamics).

In S330, the apparatus 100 for providing the content may set a sensory index parameter. The sensory index parameter may include an auditory parameter and/or a tactile parameter. The auditory parameter may include an instrument, tone quality and damping, musical texture and harmony, a tempo of music, and/or hardness and density of music. The tactile parameter may include a frequency, a duration, and/or intensity (e.g., amplitude).

In S340, the apparatus 100 for providing the content may derive an emotional care correlation equation, that is, an emotional care index.

Figure 4:
FIG. 4 is a flowchart illustrating a method for deriving an emotional care correlation equation according to an embodiment of the present disclosure.

FIG. 4 is a flowchart illustrating a method for deriving an emotional care correlation equation according to an embodiment of the present disclosure. FIGS. 5A to 5C are drawings for describing an analysis of a correlation between physical and psychophysical quantities of content according to an embodiment of the present disclosure.

In S410, an apparatus 100 for providing content in FIG. 1 may analyze a correlation between a content signal analysis factor value (or a physical quantity) and a sensory qualitative parameter. Referring to FIG. 5A, the apparatus 100 for providing the content may identify that a maximum frequency of music, a beat frequency, and a rolloff value of a waveform have a negative correlation and a mel-frequency cepstral coefficient (MFCC) has a positive correlation by means of a correlation analysis in a meditation mode. Rolloff refers to an attenuation phenomenon which occurs at highest and lowest frequencies in a frequency band of output pressure of a certain playback sound. MFCC may be a feature extracted from an audio signal, which refers to a numerical value indicating a unique feature of the sound. The apparatus 100 for providing the content may obtain the result of analyzing correlations between content signal analysis factor values and sensory qualitative parameters as shown in FIG. 5B in a stress relief mode. Referring to FIG. 5C, the apparatus 100 for providing the content may identify that a maximum frequency of music, a beat frequency, and a zero-crossing rate have a positive correlation in a timbre parameter by means of a correlation analysis in a healing mode.

In S420, the apparatus 100 for providing the content may determine an emotional care correlation equation by means of a statistical analysis based on the result of analyzing the correlation. The apparatus 100 for providing the content may execute the statistical analysis using a histogram, a scatterplot, and a probabilities-probabilities (P-P) chart and may determine a determination coefficient of the emotional care correlation equation. The histogram is a statistical analysis technique which illustrates a frequency distribution table indicating a content signal analysis factor value according to an auditory qualitative parameter as a graph. The scatterplot is a statistical analysis technique which analyzes a correlation by means of a positive correlation analysis and a negative correlation analysis and determines a slope (or intercept) of an independent variable. The P-P chart is a statistical analysis technique which examines logical validity of independent and dependent variables.

In S430, the apparatus 100 for providing the content may perform verification and evaluation for the determined emotional care correlation equation.

Figure 6:
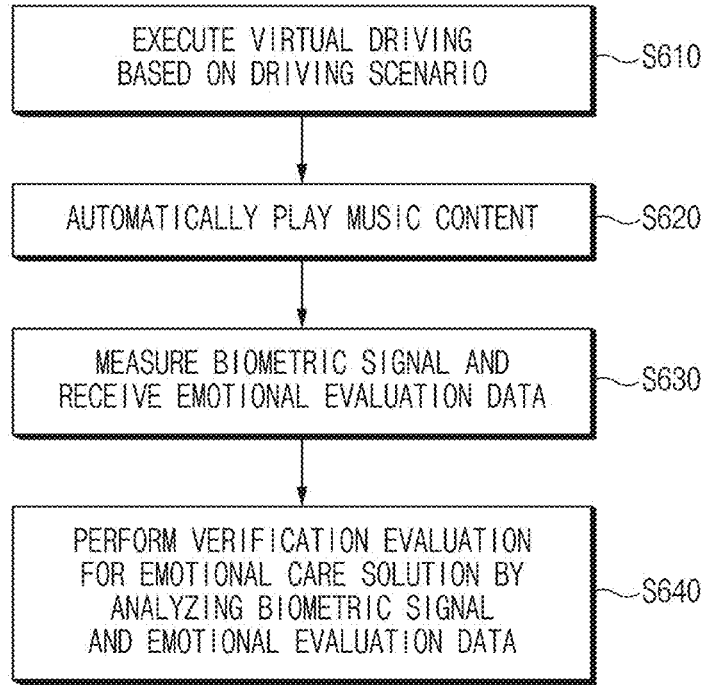
FIG. 6 is a drawing for describing a method for verifying and evaluating an emotional care solution according to an embodiment of the present disclosure.

FIG. 6 is a drawing for describing a method for verifying and evaluating an emotional care solution according to an embodiment of the present disclosure.

In S610, an apparatus 100 for providing content in FIG. 1 may execute virtual driving depending on a driving scenario.

In S620, the apparatus 100 for providing the content may automatically play music content according to an emotional care solution in a virtual driving environment.

In S630, the apparatus 100 for providing the content may measure a biometric signal (e.g., an electroencephalogram (EEG)) of a user using a biometric signal measurement device and may receive emotional evaluation data by the user using a user interface.

In S640, the apparatus 100 for providing the content may analyze the biometric signal and the emotional evaluation data and may perform verification and evaluation for an emotional care solution.

Figure 7:
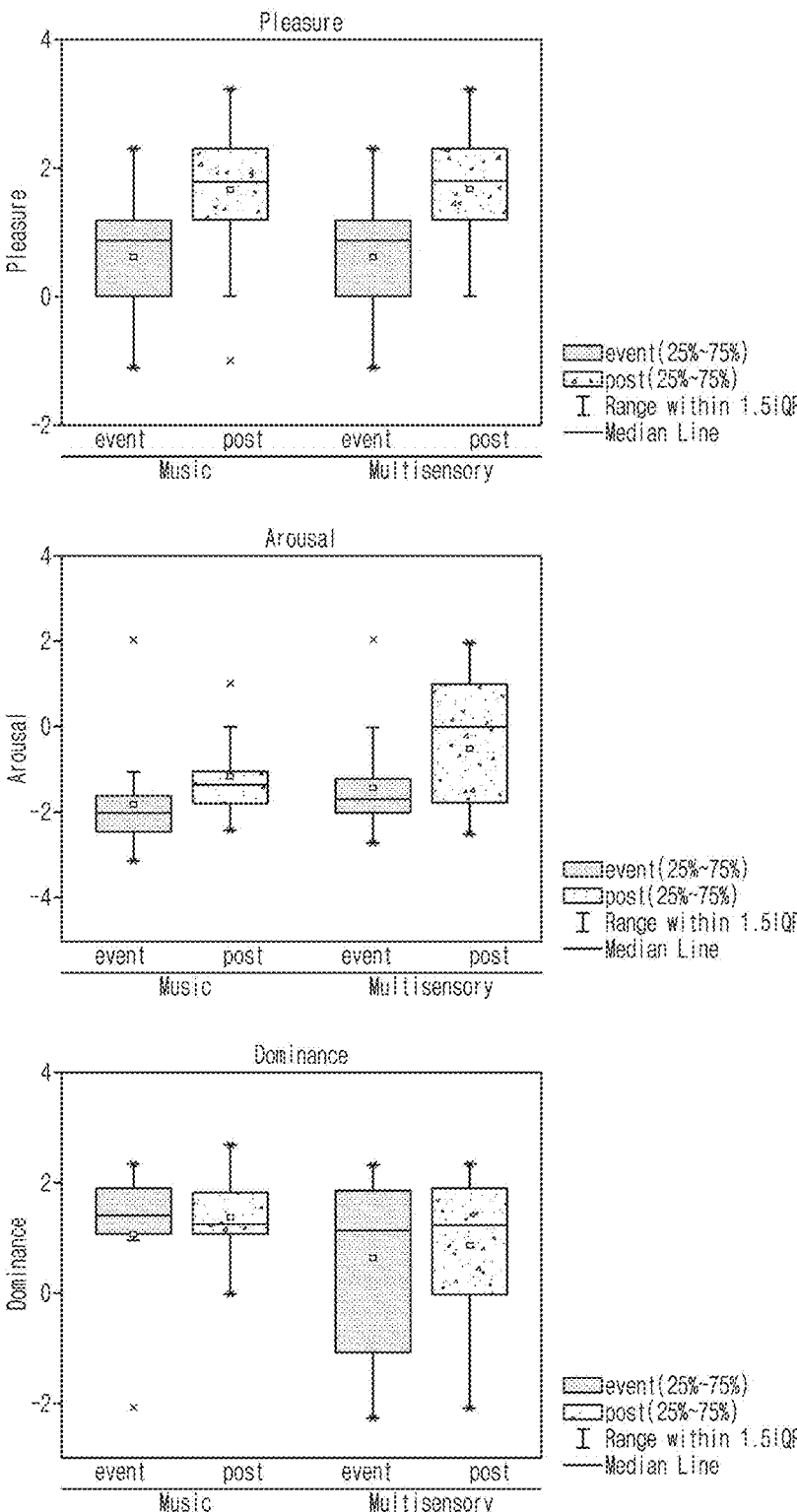
FIGS. 7, 8, and 9 are drawings illustrating the results of verifying and evaluating an emotional care solution according to an embodiment of the present disclosure.
Figure 8:
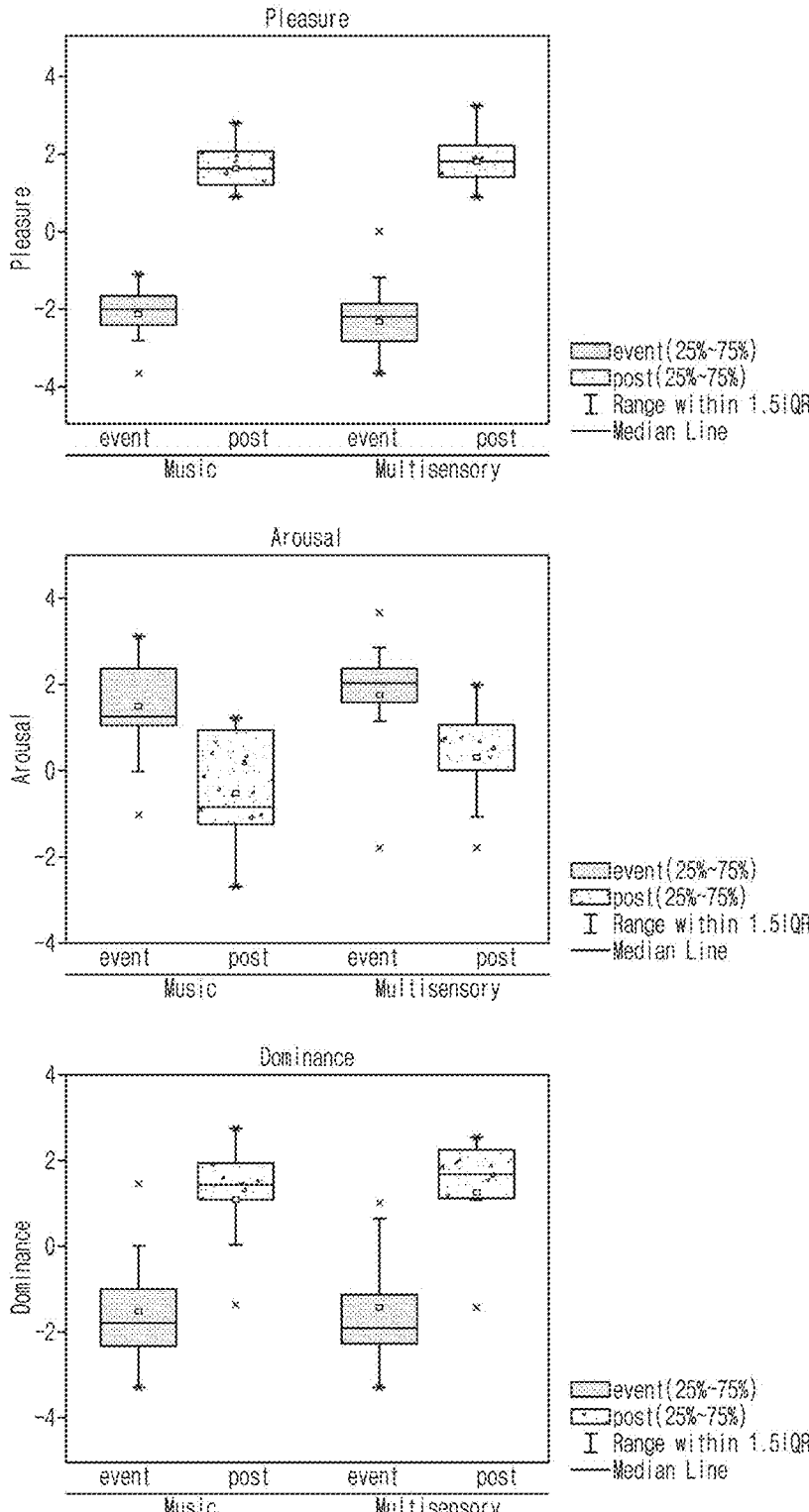
Figure 9:
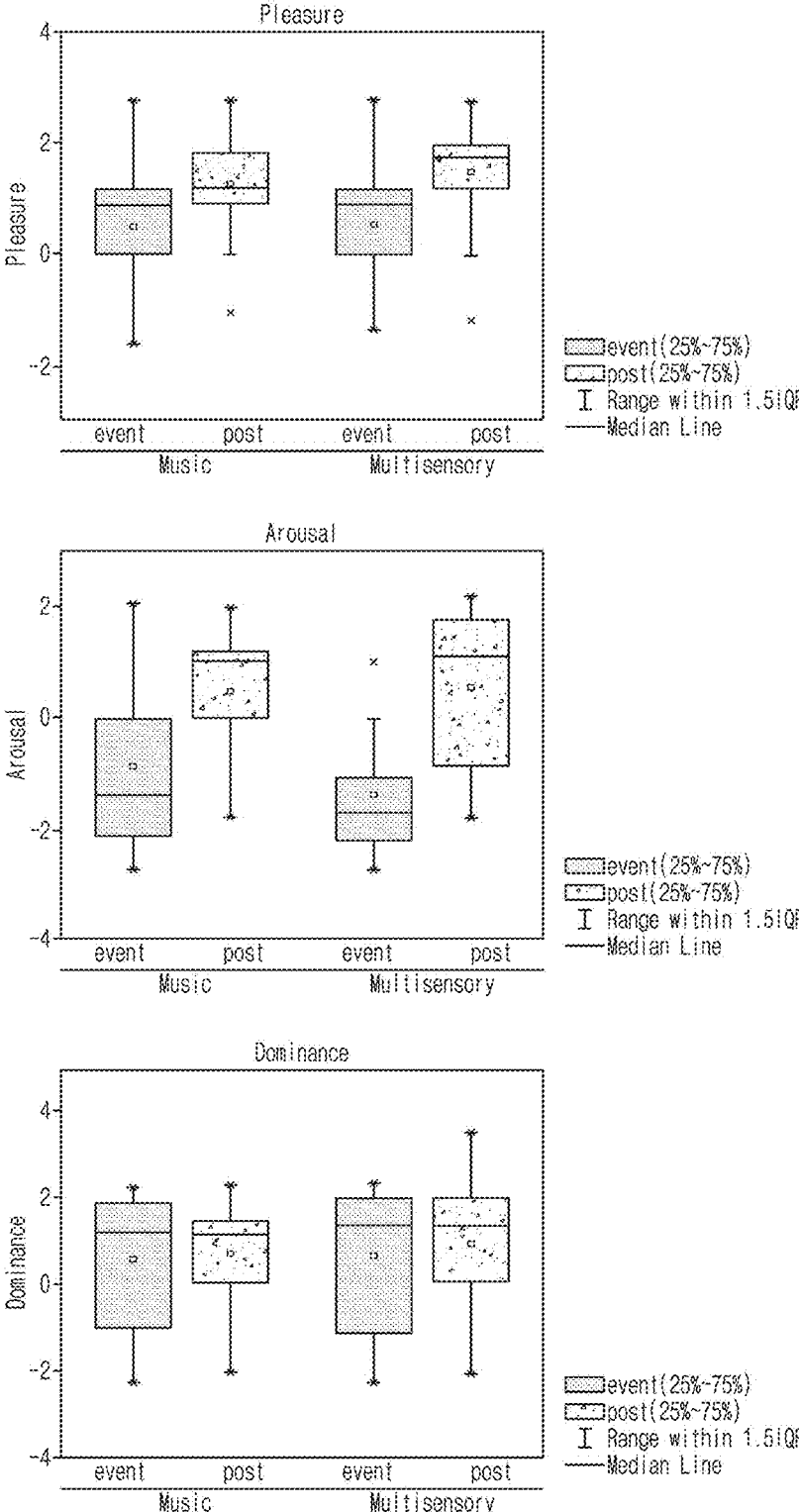

FIGS. 7 to 9 are drawings illustrating the results of verifying and evaluating an emotional care solution according to an embodiment of the present disclosure.

According to the result of performing verification and evaluation for emotional care solution content when an emotional care solution shown in FIG. 7 is in a meditation mode, pleasure emotion has a main effect for time (event and post), which is analyzed significantly, and significantly increases in a Dunn-test post-analysis result, a music solution, and a multisensory solution. Arousal emotion has a main effect for time (event and post), which is analyzed significantly, and significantly decreases in a Dunn-test post-analysis result, a music solution, and a multisensory solution. Dominance emotion has small main effect and time-stimulus type interaction significance.

According to the result of performing verification and evaluation for emotional care solution content when an emotional care solution shown in FIG. 8 is in a stress relief mode, pleasure emotion has a main effect for time (event and post), which is analyzed significantly, and significantly increases in a Dunn-test post-analysis result, a music solution, and a multisensory solution. Arousal emotion has a main effect for time (event and post), which is analyzed significantly, and significantly decreases in a Dunn-test post-analysis result, a music solution, and a multisensory solution. Dominance emotion has a main effect for time (event and post), which is analyzed significantly, and significantly increases in a Dunn-test post-analysis result, a music solution, and a multisensory solution.

According to the result of performing verification and evaluation for emotional care solution content when an emotional care solution shown in FIG. 9 is in a healing mode, pleasure emotion has a main effect for time (event and post), which is analyzed significantly, and significantly increases in a Dunn-test post-analysis result, a music solution, and a multisensory solution. Arousal emotion has a main effect for time (event and post), which is analyzed significantly, and significantly decreases in a Dunn-test post-analysis result, a music solution, and a multisensory solution. Dominance emotion has small main effect and time-stimulus type interaction significance.

Embodiments of the present disclosure may automatically play music content with regard to a driving environment and a driver's emotional state.

Furthermore, embodiments of the present disclosure may derive an emotional care index by means of a multi-regression analysis and may analyze a PAD contribution rate to automatically play music content.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

The invention claimed is:

1. An apparatus for providing content, the apparatus comprising:

a communication device configured to communicate with user equipment (UE); and a processor connected to the communication device;

wherein the processor is configured to:

analyze a music database (DB) by interworking with the UE;

extract a driver emotion model based on the analysis of the music DB;

determine an emotion determination model based on the analysis of the music DB;

derive an emotional care correlation equation by means of a multi-regression analysis based on the analysis of the music DB;

select an emotional care solution depending on a contribution rate of the emotion determination model based on the driver emotion model using the emotional care correlation equation; and automatically play music content based on the emotional care solution;

wherein the processor is further configured to:

analyze a correlation between a physical quantity and a psychophysical quantity of the music content in the music DB; and perform the deriving of the emotional care correlation equation based on the analysis of the correlation;

wherein the physical quantity includes at least one of sound pressure, a frequency, a spectrum, an envelope, a duration, or a combination thereof;

wherein the psychophysical quantity includes at least one of loudness, pitch, timbre, or a combination thereof;

wherein the processor is further configured to:

set a target driver emotion model;

search for an acoustic perceptual factor of the music content;

set a sensory index parameter of the music content; and derive the emotional care index by analyzing a correlation between the acoustic perceptual factor and the sensory index parameter, considering pressure, frequency average value or beat frequency for an auditory index and MFCC (Mel-Frequency Cepstral Coefficient) average value or a centroid average value for a tactile index, pitch, duration, loudness, timbre based on the target driver emotion model;

automatically select and play the music content based on the emotional care index using a sound output device; and control a vibration of a vehicle seat or a wearable device using a vibrator mounted to the vehicle seat, including adjusting at least one of a vibration pattern, a vibration intensity, or a vibration frequency of the vibrator, based on the played music content and based on the emotional care index to match the target driver emotion model.

2. The apparatus of claim 1, wherein the processor is further configured to classify a music genre during the analyzing of the music database.

3. The apparatus of claim 1, wherein the processor is further configured to analyze a music playback history in the music DB and to select the emotion determination model.

4. The apparatus of claim 1, wherein the processor is further configured to perform the deriving of the emotional care correlation equation using at least one of a histogram, a scatterplot, a probabilities-probabilities (P-P) chart, or a combination thereof.

5. The apparatus of claim 1, wherein the processor is further configured to perform the automatically playing of the music content by interworking with a vehicle driving condition and a driver's emotional state.

6. A method for providing content, the method comprising:

analyzing, by a processor, a music database (DB) by interworking with user equipment (UE);

extracting a driver emotion model based on the analysis of the music DB;

determining an emotion determination model based on the analysis of the music DB;

deriving an emotional care correlation equation by a multi-regression analysis based on the analysis of the music DB;

selecting an emotional care solution depending on a contribution rate of the emotion determination model based on the driver emotion model using the emotional care correlation equation; and automatically playing music content based on the emotional care solution;

wherein deriving the emotional care correlation equation includes:

analyzing a correlation between a physical quantity and a psychophysical quantity of the music content in the music DB; and deriving the emotional care correlation equation based on the analysis of the correlation;

wherein the physical quantity includes at least one of sound pressure, a frequency, a spectrum, an envelope, a duration, or a combination thereof; and wherein the psychophysical quantity includes at least one of loudness, pitch, timbre, or a combination thereof;

wherein the method further comprises:

setting a target driver emotion model;

searching for an acoustic perceptual factor of the music content;

setting a sensory index parameter of the music content; and deriving the emotional care index by analyzing a correlation between the acoustic perceptual factor and the sensory index parameter, considering pressure, frequency average value or beat frequency for an auditory index and MFCC (Mel-Frequency Cepstral Coefficient) average value or a centroid average value for a tactile index, pitch, duration, loudness, timbre based on the target driver emotion model;

wherein the processor is configured to automatically select and play the music content based on the emotional care index;

automatically selecting and playing the music content based on the emotional care index using a sound output device; and controlling vibration of a vehicle seat or a wearable device using a vibrator mounted to the vehicle seat, including adjusting at least one of a vibration pattern, a vibration intensity, or a vibration frequency of the vibrator, based on the played music content and based on the emotional care index to match the target driver emotion model.

7. The method of claim 6, wherein the extracting the driver emotion model includes:

the analyzing the music DB and classifying a music genre.

8. The method of claim 6, wherein the determining the emotion determination model includes:

analyzing a music playback history in the music DB and selecting the emotion determination model.

9. The method of claim 6, wherein the deriving of the emotional care correlation equation includes:

performing the deriving of the emotional care correlation equation using at least one of a histogram, a scatterplot, a probabilities-probabilities (P-P) chart, or a combination thereof.

10. The method of claim 6, wherein the automatically playing the music content includes:

performing the automatically playing the music content by interworking with a vehicle driving condition and a driver's emotional state.

* * * * *